June 22, 1954     A. P. VESCHIO     2,681,779
FISHING POLE HOLDER
Filed Feb. 8, 1951
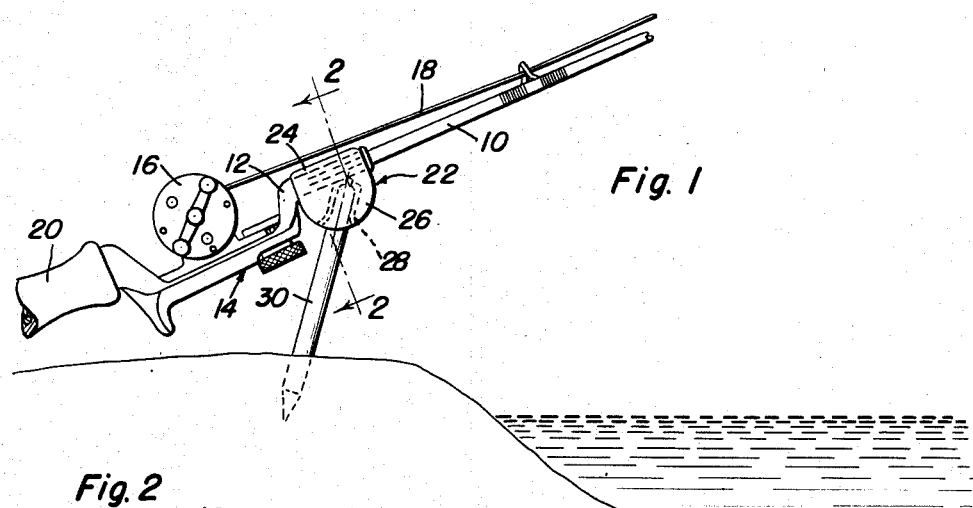
Fig. 1
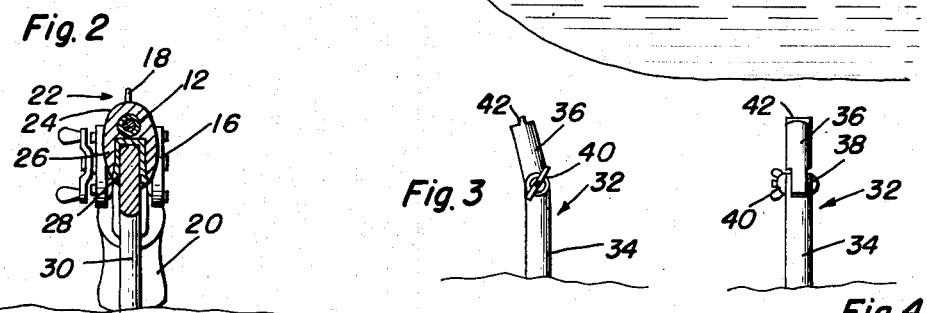
Fig. 2     Fig. 3     Fig. 4
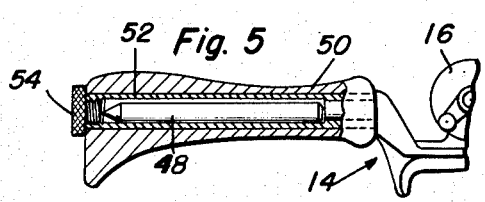 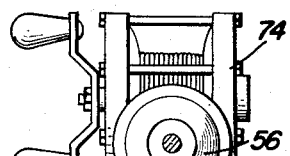
Fig. 5     Fig. 6
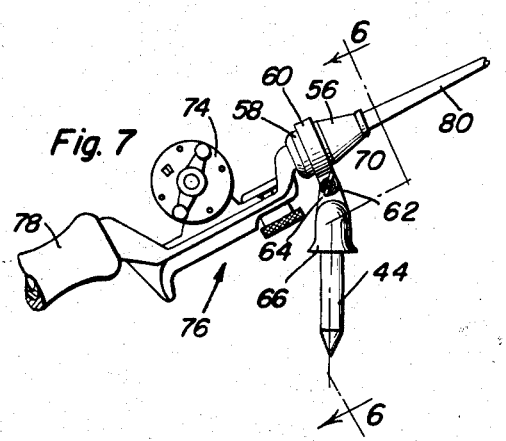 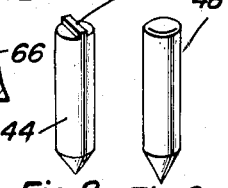
Fig. 7     Fig. 8   Fig. 9
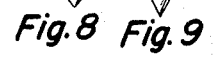
Anthony P. Veschio
INVENTOR.
BY *(signatures)*
                Attorneys Patented June 22, 1954

2,681,779

UNITED STATES PATENT OFFICE 2,681,779

FISHING POLE HOLDER

Anthony P. Veschio, Monessen, Pa., assignor of five per cent to Andrew Hrebenor and five per cent to Frank Tomaskovic, both of Monessen, Pa.

Application February 8, 1951, Serial No. 209,979

1 Claim. (Cl. 248—42)

The present invention relates to certain new and useful improvements in anglers' accessories and equipment and has more particular reference to novel ways and means whereby a fisherman's casting rod may be aptly and conveniently propped up, angled and supported for practical and satisfactory fishing.

It is a matter of common knowledge among fishermen that many and varied styles and forms of devices have been promoted for supporting a fishing pole, casting rod or the like in a suitably angled fishing position. Some of the devices have to do with pole and rod holding clamps which are applicable to available portions of a row boat or the like. Some have to do with special wharf and pier clamps. Ground stakes and the like are employed for holding the rod correctly in a position off shore.

As the reader will appreciate, after having scanned the various views of the drawings, the instant invention has to do with certain appreciable refinements and betterments in rod and pole holders characterized by appropriate anchoring stakes.

Another object of the invention is to structurally, functionally and otherwise improve upon rod and pole holders proposed by prior patentees for achieving the same general ends herein under advisement.

A still further object of the invention is to provide simple and efficient pole holders of slightly varying styles, compared to one another, wherein manufacturers and users will find their respective requirements and needs fully met and contained.

Generically construed, novelty is predicated on the one hand on a simple adapter which is designed to be fitted over an extension on the forward end portion of a conventional type reel seat, said adapter being provided with a lateral socket and said socket being arranged for reception of the upper end of an appropriately anchored and inclined stake, the stake and adapter functioning, in a collective manner, as the holding means for the casting rod and reel.

More specifically, one aspect of the invention has to do with a simple wooden or equivalent block having a bore for reception of the rod supporting extension on the forward end of the reel seat and having a second bore which is lateral to the first bore and also oblique thereto, said second bore providing a socket, said socket being lined with a bell mouth cup whereby the rod with the adapter attached may be easily dropped and capped over the upper end of the ground stakes and may be just as easily lifted up and off of the stake and which, in addition, provides a free swiveling joint between the stake and adapter.

Another and correspondingly specific aspect of the over-all invention has to do with a wooden or similar sleeve providing another form of an adapter, said sleeve having a cylindrical portion providing a mount and said mount serving to accommodate a ligature-like clamp. The clamp has attaching and hinging ears and these straddle a lug on an especially constructed socket member, the latter having a keying groove at its closed end to receive a keying rib on the upper end of a complemental ground anchoring stake.

Other objects and advantages will become readily apparent from the following description and the accompanying sheet of illustrative drawings.

In the accompanying sheet of drawings wherein like numerals are employed to designate like parts throughout the views:

Fig. 1 is a side elevational view of a fishing pole holder showing the manner in which same is staked and used.

Fig. 2 is a section taken on the irregular vertical line 2—2 of Fig. 1 looking in the direction of the arrows;

Fig. 3 is an elevational view of a modified form of ground stake;

Fig. 4 is a view at right angles to Fig. 3 observing the construction in the latter view in a direction from right to left;

Fig. 5 is a view showing a further improvement, that is, wherein the hand grip is fashioned to provide storage means for the stake when the latter is not in use;

Fig. 6 is an enlarged view on the irregular line 6—6 of Fig. 7 looking in the direction of the arrows;

Fig. 7 is a fragmentary side elevational view of a rod and reel with a modified type of rod holder in use;

Fig. 8 is a perspective view of one form of stake; and,

Fig. 9 is a perspective view of a simpler form of stake.

Reference is had first to the construction illustrated in Figs. 1 and 2. Here the conventional casting rod is denoted at 10 and this is attached to an end extension 12 on the reel yoke or seat 14. The reel is denoted at 16 and the line at 18. The hand grip is denoted at 20. These are all old parts so the improvement here has to do with and adapter block, of wood or other suitable material, which is denoted by the numeral 22.

This is preferably of the approximate shape shown and has a portion 24 with a longitudinal bore therethrough which bore slips over the extension 12. By simply separating the rod 10 from extension 12 the adapter 22 is fitted and held in place. The adapter includes a suitable body portion 26 whose under side is provided with a socket having an appropriate metal or equivalent cup-like thimble or cup-like lining 28 therein. The mouth portion of the cup is flared so that it may be fitted readily over the upper end portion of the ground stake 30. Here the stake is simply forced in the ground in the manner shown in Fig. 1 and the adapter is applied and the rod and reel assembly are then ready to be applied to and removed from the stake in an obvious manner. In this arrangement the cup-like lining in the socket permits the adapter to have a slight swiveling motion, whereby the rod and reel is held not only in the proper fishing position but is allowed to swing in a horizontal plane from side to side.

The stake 30 in Figs. 1 and 2 is a solid one-piece unit. A modified stake is shown in Figs. 3 and 4 and this is denoted by the numeral 32 and comprises a lower section 34 which has a pointed end and which is driven into the ground and has an upper section 36. The two sections are hinged together by way of a bolt 38 provided with a thumb-nut 40 (see Fig. 4). The upper section may be angled to the desired position and it is preferably provided on its upper extremity with a suitable rib 42 providing a keying element. Further, in connection with the stakes, attention is called to Figure 8 wherein a one-piece stake with a pointed lower end is denoted by the numeral 44 and this has a keying rib 46 on its upper end. The stake to the right in Fig. 9 is denoted by the numeral 48 and this is the same as 44 except that it is without the keying rib. Therefore, and insofar as the stakes are concerned they may be of one-piece with or without keying ribs, or of sectional construction with or without keying ribs as shown in Figs. 3 and 4. In any event, the invention requires, when used off shore, an appropriate ground penetrating stake.

In the modifications shown in Fig. 5 the hand grip 50 is hollow and provided with an appropriate lining 52 which provides a receiver or receptacle for the stake 48. The receptacle has a screw cap 54 whereby to provide an appropriate container for a spare stake. The adaptation appearing in Fig. 5 is an optional aspect of the invention.

It may not be desirable under all circumstances to apply the adapter 22 as shown in Fig. 1. There may be instances where a modified adaptation is desirable. To this end an adapter sleeve of a substantial conical form as shown at 56 in Fig. 7 may be utilized. This adapter is of wood or appropriate material and has a cylindrical portion 58. The cylindrical portion constitutes a mount and is adapted to accommodate a split clamping band 60 having ears 62 straddling a complemental ear or lug 64 on a bell-type cap or socket member 66. Piercing the ears and lug is a bolt 68 with a thumb nut 70 whereby to hingedly connect the bell-type socket member with the clamping band, and if desired the socket member 66 may be provided on its interior with a simple groove providing a key-way 72 to accommodate the key 46 on the upper end of the stake 44. Here the stake and the socket members are separately keyed with one another and function to provide a perch on which the split clamping band is hingedly and adjustably mounted. Thus by way of the clamping band and adapter means 56 a different form of holder is had. In the showing of this modification in Fig. 7 the reel is denoted at 74, with the reel seat or yoke member at 76, the hand grip at 78 and the rod or pole at 80.

It will be evident from the illustrations appearing in the drawings that in both forms of the invention seen in Figs. 1 and 7 an adapter is applied to the reel holding seat or yoke and that a stake is employed and that socket means is also employed wherein the socket means is releasably connectable with the upper end of the stake. The stake and socket connection may be either keyed or may swivel and the claims are to be construed accordingly.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice provided no departure is made from the invention as claimed.

Having described the invention, what is claimed as new is:

For use in conjunction with a reel seat having a hand-grip at its rear end and a socketed rod holding extension at its opposite forward end, a rod having its inner end fitting into the extension, and a reel mounted in said seat; a rod holding and tilting device comprising, in combination, an adapter sleeve adapted to be fitted over said extension, said sleeve being provided with a cylindrical portion providing a mount for a clamp, a clamping band encircling said mount and provided with spaced parallel bolt equipped ears, a bell-mouthed socket member having a socket, said socket being cylindrical in cross-section and provided at its inner end with a groove providing a keyway, and provided with a lug, said lug being hingedly and separably bolted to said ears, and a ground stake having an upper end portion fitting removably and telescopically into the socket and provided on its upper end with a rib, said rib constituting a key and being removably keyed in said keyway.

References Cited in the file of this patent

UNITED STATES PATENTS

| Number | Name | Date |
|---|---|---|
| 142,126 | Senieur | Aug. 26, 1873 |
| 995,942 | Bain | June 20, 1911 |
| 1,001,195 | Gillette | Aug. 22, 1911 |
| 1,366,710 | Anker | Jan. 25, 1921 |
| 1,749,302 | Rasmussen | Mar. 4, 1930 |
| 2,171,361 | Gits et al. | Aug. 29, 1939 |
| 2,184,583 | Danko | Dec. 26, 1939 |
| 2,243,388 | Magyarosi | May 27, 1941 |
| 2,316,918 | Wallace | Apr. 20, 1943 |
| 2,429,288 | Miller | Oct. 21, 1947 |
| 2,454,458 | Kaetker | Nov. 23, 1948 |
| 2,459,549 | Smith | June 18, 1949 |
| 2,479,055 | Baur | Aug. 16, 1949 |
| 2,506,321 | Vosburgh | May 2, 1950 |
| 2,518,908 | Korus | Aug. 15, 1950 |
| 2,534,027 | Irvan | Dec. 12, 1950 |
| 2,546,280 | Stein | Mar. 27, 1951 |
| 2,566,496 | Montano | Sept. 4, 1951 |